United States Patent

Batistic et al.

[11] Patent Number: 6,012,010
[45] Date of Patent: Jan. 4, 2000

[54] PROCESS FOR IMPROVING THE REGULATING BEHAVIOUR OF AN ANTI-LOCK SYSTEMS

[75] Inventors: Ivica Batistic, Frankfurt am Main; Helmut Fennel, Bad Soden; Hans-Joachim Büttner, Hohenahr, all of Germany

[73] Assignee: ITT Manufacturing Enterprises Inc., Wilmington, Del.

[21] Appl. No.: 08/981,165

[22] PCT Filed: Jun. 18, 1996

[86] PCT No.: PCT/EP96/02638

§ 371 Date: May 4, 1998

§ 102(e) Date: May 4, 1998

[87] PCT Pub. No.: WO97/00799

PCT Pub. Date: Jan. 9, 1997

[30] Foreign Application Priority Data

Jun. 22, 1995 [DE] Germany ............... 195 22 632

[51] Int. Cl.$^7$ ................................................. G06F 7/00
[52] U.S. Cl. ...................... 701/72; 701/83; 701/91; 701/70; 303/186; 303/189; 303/901
[58] Field of Search ................. 701/70, 71, 72, 701/74, 78, 83, 89, 91; 303/163, 165, 186, 189, 901; 180/197; 340/444

[56] References Cited

U.S. PATENT DOCUMENTS

| | | | |
|---|---|---|---|
| 3,889,186 | 6/1975 | Rodi | 303/173 |
| 5,669,679 | 9/1997 | Hammoud et al. | 303/165 |
| 5,691,900 | 11/1997 | Luckevich et al. | 701/41 |
| 5,694,321 | 12/1997 | Eckert et al. | 701/91 |
| 5,774,821 | 6/1998 | Eckert et al. | 701/78 |
| 5,863,105 | 1/1999 | Sano | 303/146 |

FOREIGN PATENT DOCUMENTS

| | | |
|---|---|---|
| 0363959 | 10/1989 | European Pat. Off. . |
| 3919347A1 | 2/1990 | Germany . |
| 3939069A1 | 5/1991 | Germany . |
| 4109925A1 | 10/1991 | Germany . |
| 4141877A1 | 6/1992 | Germany . |
| 4234819A1 | 4/1993 | Germany . |
| 4305155A1 | 8/1994 | Germany . |

*Primary Examiner*—Jacques H. Louis-Jacques
*Assistant Examiner*—Gertrude Arthur
*Attorney, Agent, or Firm*—Rader, Fishman & Grauer PLLC

[57] ABSTRACT

To improve the control behavior of an anti-lock control system or brake slip control system, more particularly, to improve the steerability of a vehicle and its drivability when braking during cornering is performed, criteria for cornering identification and for determining the direction of cornering are derived from the wheel slip of the individual wheels. When cornering is identified, the normal control mode which is intended for straight travel and is configured for an individual control of all wheels or an individual control of the front wheels in conjunction with a select-low control of the rear wheels is changed to a cornering control mode. In the cornering control mode, the average pressure level of the curve-inward front wheel is decreased by a predetermined value and the average pressure level of the curve-outward front wheel is increased by a predetermined value. A corresponding variation of the average pressure level on the rear wheels is also possible in vehicles having a select-low control and valve pairs on the individual wheels.

8 Claims, 2 Drawing Sheets

PROCESS FOR IMPROVING THE REGULATING BEHAVIOUR OF AN ANTI-LOCK SYSTEMS

BACKGROUND OF THE INVENTION

The present invention relates to a method of improving the control behavior of an anti-lock control system, more particularly, the steerability of a vehicle and its drivability during cornering, wherein the rotational behavior of the vehicle wheels is measured and evaluated to determine a vehicle reference speed which is used as a reference value for ascertaining the wheel slip and for braking pressure modulation, and wherein criteria for cornering identification and for identification of the direction of cornering are derived from the wheel slip of the individual wheels.

German patent No. 34 13 738 discloses an anti-lock control system (ABS) including a cornering identification circuit which is also based on measuring the wheel slip. For cornering identification, the slip values on the wheels of one vehicle side are added and compared with the slip sum of the wheels of the other vehicle side. A cornering identification signal is produced as soon as the difference of the slip sums exceeds a predetermined limit value. When cornering is identified, selection criteria, such as "select-low" or "select-high", by which the pressure variation in the individual braking pressure control channels of the brake system is controlled, and limit values for activation of the selection criteria are varied. The objective is to adapt the control to the different conditions during straight travel and cornering.

The older German patent application No. 21 19 590 teaches producing a cornering identification signal by means of a transverse acceleration measuring device, for example, a mercury switch.

The object of the present invention is also to provide an improved control of an anti-lock control system (ABS) or a brake slip control system by adapting the control to the different conditions during straight travel and cornering. A special objective is to improve the steerability of the vehicle and its driving stability during cornering.

SUMMARY OF THE INVENTION

It has been found that this object can be achieved by a method of the type described hereinabove, the special features of which involve that, when cornering is identified, the normal control mode which is intended for straight travel and is configured for an individual control of all wheels or an individual control of the front wheels in conjunction with a select-low control of the rear wheels is changed to a cornering control mode, wherein in comparison to the normal control mode, the average pressure level of the curve-inward front wheel is decreased by a predetermined value and the average pressure level of the curve-outward front wheel is increased by a predetermined value. In general (even though not in all cases), the amount of decrease on the curve-inward wheel should correspond to the amount of increase on the second wheel of this axle.

The concept underlying the present invention is that the desired improvement of the control behavior which equally ensures enhanced steerability and driving stability and a high braking effect, namely the attaining of a minimum short stopping distance, can be achieved by taking into account the interaction of the longitudinal and cornering forces on all wheels. Taking into account the longitudinal and cornering forces for each individual wheel is not successful. Instead, according to the present invention, influencing the longitudinal and cornering forces on the wheels is utilized to develop an understeering yawing torque which counteracts oversteering of the vehicle caused by cornering. Oversteering is due to the fact that the centrifugal force—due to an insufficient axle load or due to drive effects and brake slip—cannot be supported by the sum of all lateral forces. Therefore, according to the present invention, a special control mode is activated when cornering is identified to correct the average pressure level on the curve-inward and the curve-outward wheels (or only of the front wheels) in the described fashion.

In a preferred aspect of the method of the present invention, the amount of decrease of the average pressure level on the curve-inward wheel and/or the amount of increase thereof on the curve-outward front wheel is varied or predetermined as a function of the rotational speed difference or the slip difference of the rear wheels.

In a vehicle with a select-low control on the rear axle, appropriately, the average pressure level is decreased on the curve-inward rear wheel and increased on the curve-outward rear wheel in the cornering control mode. In this case, the rear wheels as well as the front wheels contribute to developing a yawing torque which compensates oversteering.

In a particularly favorable method of cornering identification, the wheel slip values of the individual wheels are filtered and the filtered values are compared, and switch-over to the cornering control mode is effected when simultaneously the filtered wheel slip on the two front wheels is in excess of a predetermined front-wheel-related maximum slip value that is responsive to the instantaneous vehicle speed or vehicle reference speed, and the filtered wheel slip of one rear wheel is above a predetermined maximum slip value that is responsive to the vehicle (reference) speed, and the filtered wheel slip of the other rear wheel is below a predetermined minimum slip value that is responsive to the vehicle reference speed, and the rear wheel having the lower slip value or the higher speed, respectively, is assessed as the curve-outward rear wheel to determine the direction of cornering.

When programmed circuitries, such as microprocessors, microcomputers, or like elements, and filters with a low-pass characteristic are used, favorably, the filtered wheel slip signals are produced according to the relation $$fws_{neu} = fws_{alt} + (fws_{alt} - fws_{neu})/T$$

and '$fws_{neu}$' refers to the filtered wheel slip which was the last one ascertained in the working cycle and '$fws_{alt}$' refers to the previously ascertained filtered wheel slip. 'T' implies a predetermined time constant which ranges in the order between 30 and 200 msec, more particularly between 50 and 100 msec.

Further, according to the present invention, the difference of the filtered slip values of the rear wheels is determined in the cornering control mode, and the control threshold on the curve-inward front wheel which defines the average pressure level is increased according to the relation $$\Delta RS = k_1 * \Delta fws_{HA} + k_2 1/a_{FZ}$$

and decreased on the curve-outward wheel. '$\Delta RS$' implies the amount of the threshold variation, '$\Delta fws_{HA}$' refers to the difference of the slip values on the rear wheels, '$a_{FZ}$' implies the vehicle acceleration, and '$k_1, k_2$' are constants.

The method of the present invention takes effect on the slip control in the partial braking range, namely in braking operations below the wheel-lock threshold, and on the pressure variation in anti-lock control braking operations.

The constants $k_1$, $k_2$ in the above-mentioned relation, which applies to the control thresholds, adopt different values in the partial braking range and in the ABS range. Suitably, the optimum values for $k_1$, $k_2$ are determined empirically.

Further features, advantages and possible applications of the present invention can be seen in the following description of embodiments, making reference to the accompanying drawings.

DETAILED DESCRIPTION OF THE DRAWINGS

Figure 1:
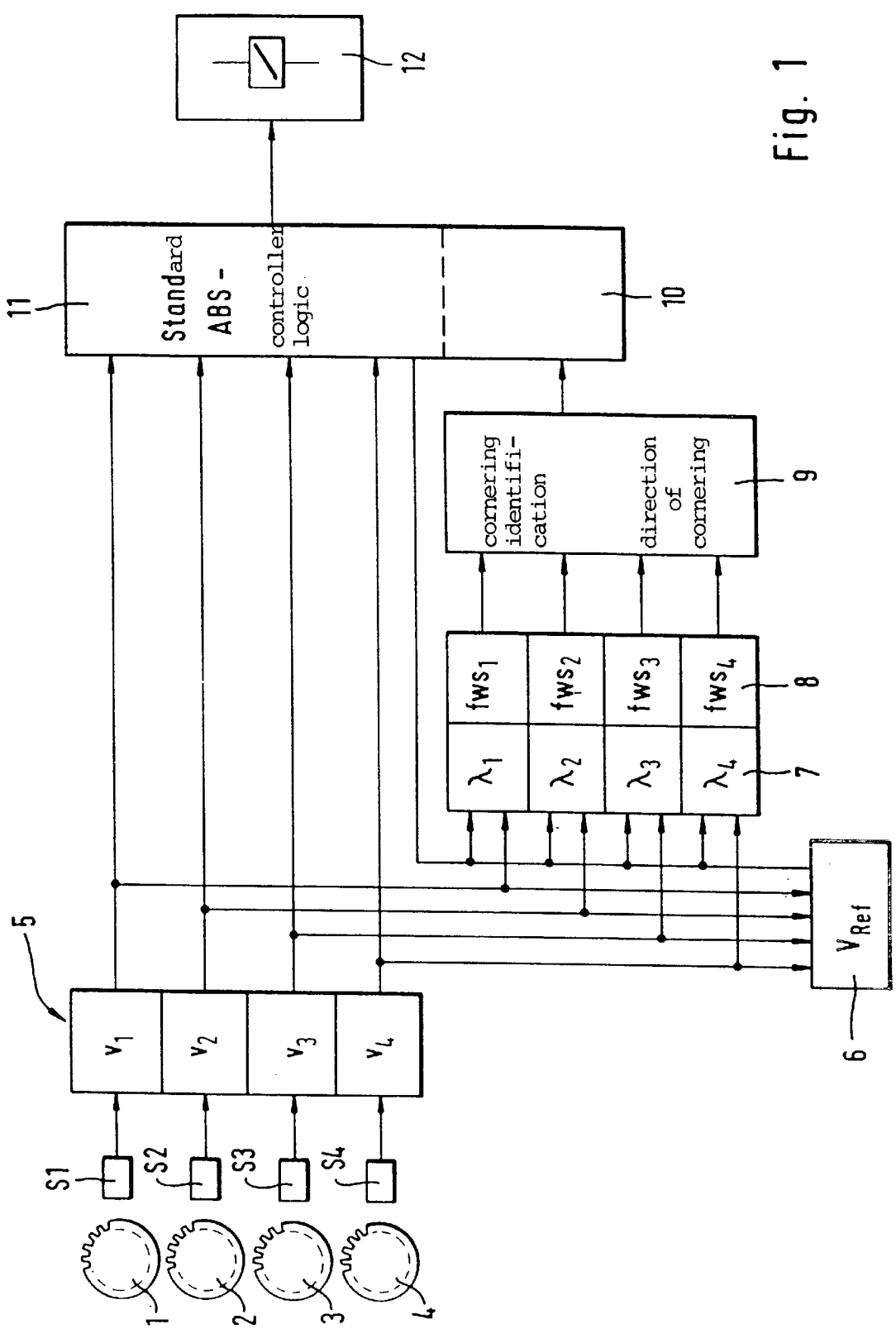
FIG. 1 is a schematically simplified block diagram view of the main electronic components of a circuitry for implementing the method of the present invention.

The operating principle of a circuitry for anti-lock or brake slip control is represented in FIG. 1. The rotational behavior of the individual vehicle wheels is measured by measuring data emitters or toothed discs 1 to 4 co-rotating with the vehicle wheels and by transducers or wheel sensors S1 to S4. An alternating voltage is generated in the present embodiment having a frequency which corresponds to the wheel speed.

The wheel speed signals $v_1$ to $v_4$ are produced by conditioning the the sensor signals in a circuit 5. A vehicle reference speed $V_{Ref}$ is produced in a known fashion in a combining circuit 6 by logically combining the output signals of circuit 5, i.e. the speed signals $v_1$ to $v_4$. Among others, the vehicle reference speed is used as a reference value to determine the wheel slip $\lambda_1$ to $\lambda_4$ of the individual vehicle wheels and, thus, as a reference value for braking pressure modulation.

A circuit block 7 includes the individual circuits for determining the wheel slip $\lambda_1 \ldots \lambda_4$ by comparing the vehicle reference speed with the respective wheel speed $v_1$ to $v_4$. The wheel slip is the result of the difference $$\lambda_i = v_{Ref} - v_i$$

and i=1 . . . 4.

When a programmed circuit, for example, a microcomputer, is used, block 7 represents the program steps to calculate the slip $\lambda_i$ (i=1 . . . 4) of the individual vehicle wheels.

Each slip signal passes in a circuit 8 through a filter with a low-pass characteristic having a filter time constant in the order between 50 and 200 msec, for example, 70 msec. A filtered wheel slip signal $fws_i$ is produced. Generally, the relation $$fws_i = \lambda_i(1-e^{t/T}),$$

with =1 . . . 4 applies to the filtered signal $fws_i$. 'T' is the time constant of the filter.

When a digital filter is used, according to the present invention, the filtered wheel slip signal $fws_i$ is calculated according to the relation $$fws_{neu} = fws_{alt} + (fws_{alt} - fws_{neu})/T$$

Of course, the filtered wheel slip signal is ascertained individually for each wheel.

The filtered wheel slip values $fws_i$ are sent to an evaluating circuit 9 where they are analyzed and processed. Cornering identification with respect to qualitative and quantitative criteria is performed in circuit 9. The direction of cornering is also determined by evaluating and logically combining the slip signals and slip difference signals. The result of this slip assessment by means of circuit 9 is sent through an additional circuit 10, i.e. a circuit in addition to the proper standard ABS control logic 11, to adjust the anti-lock or slip control to the special conditions caused by cornering.

The output of the control logic 11 (by way of conditioning and evaluating circuits not shown) finally leads to the actuators or modulators 12 by which the braking pressure of a brake system is influenced in the necessary manner. Generally, up-to-date antilock systems use electromagnetically operable hydraulic valves, for example, multi-way valves, for the modulation or control of the braking pressure in the individual wheel brakes of a hydraulic brake system.

The proper ABS control logic is also based on the evaluation of the conditioned wheel speed signals $v_1$ to $v_4$ in consideration of the vehicle reference speed $v_{Ref}$.

Figure 2:
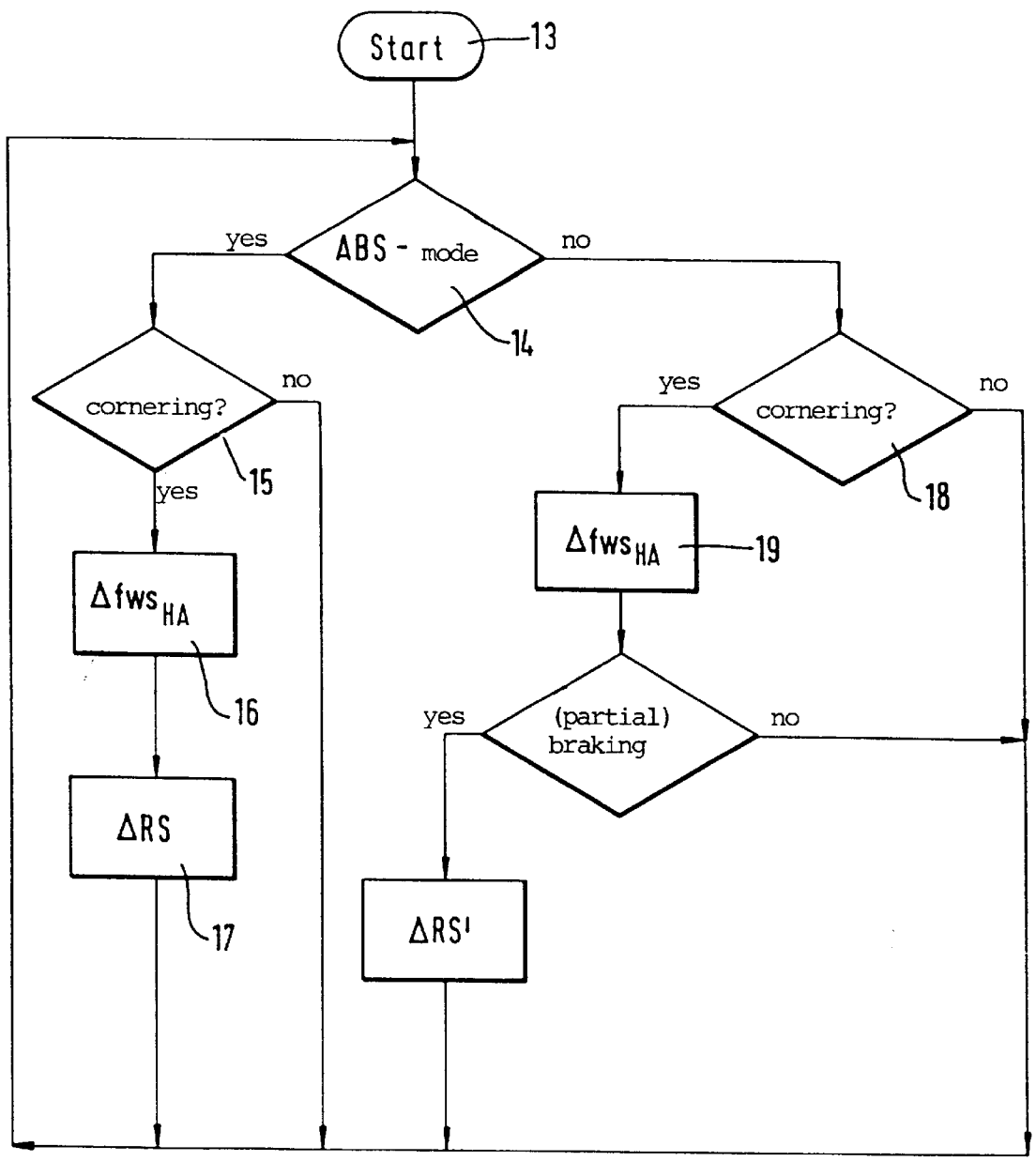
FIG. 2 is a flow chart illustrating the operation of the circuit of FIG. 1 or the program run when a programmed circuit is used.

The described operations of the circuitry of FIG. 1 can be achieved by programmed circuits, such as microcomputers, etc., as has been explained hereinabove. Controller technology of this type is even preferred nowadays. The embodiment of FIG. 2 shows a section of a flow chart or a program plan illustrating the combining of individual steps of the method of the present invention. After the 'START' (represented by reference numeral 13) of the program section described, it is initially established (represented by a rhombus 14) whether an ABS mode prevails at the moment, or whether a partial braking operation (ABS-mode: no) is performed at the moment.

In the ABS mode, the further program run depends on the decision (at 15) whether cornering identification prevails. If yes, in the embodiment of FIG. 2, the slip difference or speed difference of the rear wheels is calculated by a program element 16 according to the relation $$\Delta fws_{HA} = |fws_{HL} - fws_{HR}|$$

Subsequently, in a program element 17, the control thresholds on the curve-outward front wheel are increased and the threshold on the curve-inward front wheel is decreased according to the relation $$\Delta RS = k_1 * \Delta fws_{HA} + k_2 \, 1/a_{FZ}$$

$\Delta RS$ designates the variation of the control threshold, $a_{FZ}$ refers to the vehicle acceleration and $k_1$, $k_2$ are factors. The pressure level is reduced on the curve-inward front wheel and increased on the curve-outward front wheel by this threshold increase or decrease, respectively. The amount of the decrease or increase is predetermined by the rotational speed difference or slip difference of the rear wheels, ascertained by program element 16.

The method of the present invention also takes effect on a partial braking operation, namely a normal braking operation, where wheel lock tendencies or wheel instabilities are absent.

When the system is not in an ABS control mode, the program run leads to the right in the branch point 14. When the vehicle drives around a bend, and this is identified (at 18) by the control, again the slip difference $\Delta fws_{HA}$ of the rear wheels is determined by way of program element 19. The slip difference contains an information about the transverse acceleration of the vehicle.

When a braking operation exists, i.e. a partial braking operation, and the corresponding question (at 20) is affirmed, the control thresholds on the front wheels are varied also in this situation. Exactly as in the above-described ABS mode, control threshold variations ΔRS' are determined in the program element 21 according to the relation $$\Delta RS' = k_1'{}^* \Delta fws_{HA} + k_2' \, 1/a_{FZ}$$

However, in this case, namely outside an ABS control operation, other values apply to the constants $k_1'$, $k_2'$ than in the ABS mode.

After termination of the threshold increase, the "No" outputs of the decision points 15, 18, and 20, exactly as the output signals, lead back to the start of the program loop illustrated by way of the program elements 17 and 21. Thus, the polls and actions described are repeated in the working cycle of the controller.

The method of the present invention permits a simple intervention to stabilize the vehicle during cornering or when braking is effected during cornering, in the ABS mode and in partial braking operations. In the presence of criteria for cornering identification, a stabilizing yawing torque is generated by variation of the control thresholds or decrease of the average pressure level on the curve-inward wheels or on the curve-inward front wheel and increase of the pressure level on the curve-outward wheels (front wheel). Because the braking pressure on the curve-outward wheel or on the curve-outward wheels which are subjected to higher stress during cornering is increased for this purpose (i.e., the braking pressure variation tendency is "correct") the braking effect is increased and the stopping distance is reduced in addition to the stability benefit. By no means is it necessary to put up with a longer stopping distance for gaining in stability.

The cornering situation which causes transverse accelerations is achieved by logically combining and evaluating the slip values on each individual wheel according to the present invention. The need for expensive transverse acceleration sensors and like elements for the qualitative and quantitative cornering identification is eliminated.

In a vehicle with rear-wheel drive, black-and-white brake circuit allotment and a three-channel ABS system, generally, only one valve pair (inlet and outlet valve) is provided for the control of the rear-axle braking pressure. According to the present invention, only the braking pressure in the front wheels or the average braking pressure level in the front-wheel brakes is varied in the described fashion in comparison to conventional ABS systems in this case. The curve-inward front wheel is controlled more precisely, i.e., the average pressure level is decreased, and the control on the curve-outward front wheel becomes less precise.

The extent of the decrease and increase results from the difference of the rear-wheel speeds, as has been explained hereinabove. The greater the difference, the greater the yawing torque caused by the method of the present invention must be in order to achieve the stabilizing effect, or in order to compensate for oversteering of the vehicle which is due to cornering.

Different amounts of longitudinal forces on the front axle are caused by the braking pressure modulation described. In addition to the increased longitudinal force, the curve-outward wheel also has a reduced cornering force. The yawing torque (torque about the vertical axis) which is generated by these two force components counteracts oversteering of the vehicle and, thus, has a stabilizing effect.

In front-wheel driven vehicles having a diagonal brake circuit allotment and a three-channel ABS system, the rear-wheel brakes are connected by way of separate valve pairs. In this case, the braking pressure variation according to the method of the present invention can also be extended to the rear wheels so that the front wheels and the rear wheels contribute to stabilizing the vehicle during cornering or to compensating its oversteering behavior. This improvement is preferably achieved because the generally provided control of the rear-axle pressure according to the select-low criterion is removed at least in part, and the average pressure level is decreased on the curve-inward rear wheel and increased on the curve-outward rear wheel.

In vehicles with a front-wheel drive and a diagonal brake circuit allotment, the possibilities of a stabilizing intervention by variation of the pressure level in the front-wheel brakes are slightly reduced due to drive effects. In these vehicles, the described variation of the pressure level in the rear-wheel brakes with a view to stabilizing the vehicle during cornering or compensating the oversteering tendency becomes more important.

We claim:

1. A method of improving the control behavior of an anti-lock control system for a four-wheeled vehicle during cornering, wherein the rotational behavior of the vehicle wheels is measured and evaluated to determine a vehicle reference speed which is used as a reference value for ascertaining a wheel slip as well as for braking pressure modulation, and wherein criteria for cornering identification and for identification of the direction of cornering are derived from the wheel slip of the individual wheels, wherein, when cornering is identified, a normal control mode—which is intended for straight travel and is configured for an individual control of multiple wheels—is changed to a cornering control mode, wherein in comparison to the normal control mode, an average braking pressure level of the curve-inward front wheel is decreased by a predetermined value and an average braking pressure level of the curve-outward front wheel is increased by a predetermined value wherein, in a vehicle with a select-low control on the rear wheels, the average pressure level is decreased on the curve-inward rear wheel and increased on the curve-outward rear wheel in the cornering control mode.

2. The method as claimed in claim 1,
   wherein the amount of variation of at least one of the average braking pressure levels is a function of the rotational speed difference of the rear wheels.

3. The method as claimed in claim 1 wherein, when programmed circuitries and filters with a low-pass characteristic are used, the filtered wheel slip signals are produced according to the relation $$fws_{neu} = fws_{alt} + (fws_{alt} - fws_{neu})/T$$

and '$fws_{neu}$' refers to the filtered wheel slip which was the last one ascertained, and "$fws_{alt}$" refers to the previously ascertained filtered wheel slip, and 'T' implies a predetermined time constant which ranges in the order between 30 and 200 msec.

4. The method as claimed in claim 3, wherein the time constant ranges in the order between 50 and 100 msec.

5. A method of improving the control behavior of an anti-lock control system for a four-wheeled vehicle during cornering, wherein the rotational behavior of the vehicle wheels is measured and evaluated to determine a vehicle reference speed which is used as a reference value for ascertaining a wheel slip as well as for braking pressure modulation, and wherein criteria for cornering identification and for identification of the direction of cornering are derived from the wheel slip of the individual wheels, wherein, when cornering is identified, a normal control mode—which is intended for straight travel and is configured for an individual control of multiple wheels—is changed to a cornering control mode, wherein in comparison to the normal control mode, an average braking pressure level of the curve-inward front wheel is decreased by a predetermined value and an average braking pressure level of the curve-outward front wheel is increased by a predetermined value wherein, for cornering identification, the wheel slip values of the individual wheels are filtered and the filtered values are compared, and wherein switch-over to the cornering control mode is effected when simultaneously the filtered wheel slip on the two front wheels is in excess of a predetermined front-wheel-related maximum slip value that is responsive to a vehicle reference speed, the filtered wheel slip of one rear wheel is above a predetermined rear-wheel-related maximum slip value that is responsive to the vehicle reference speed, and the filtered wheel slip of the other rear wheel is below a predetermined rear-wheel-related minimum slip value that is responsive to the vehicle reference speed, and wherein the rear wheel having the higher speed is assessed as the curve-outward rear wheel to determine the direction of cornering.

6. The method as claimed in claim 5, wherein a value in the order between 3 and 10% of the vehicle reference speed is predetermined for the front-wheel-related maximum slip value, a value in the order between 2 and 5% of the vehicle reference speed is predetermined for the rear-wheel-related maximum slip value, and a value in the order between 0.5 and 2% of the vehicle reference speed is predetermined for the rear-wheel-related minimum slip value.

7. A method of improving the control behavior of an anti-lock control system for a four-wheeled vehicle during cornering, wherein the rotational behavior of the vehicle wheels is measured and evaluated to determine a vehicle reference speed which is used as a reference value for ascertaining a wheel slip as well as for braking pressure modulation, and wherein criteria for cornering identification and for identification of the direction of cornering are derived from the wheel slip of the individual wheels, wherein, when cornering is identified, a normal control mode—which is intended for straight travel and is configured for an individual control of multiple wheels—is changed to a cornering control mode, wherein in comparison to the normal control mode, an average braking pressure level of the curve-inward front wheel is decreased by a predetermined value and an average braking pressure level of the curve-outward front wheel is increased by a predetermined value wherein a difference of filtered slip values of the rear wheels is determined in the cornering control mode, and a control threshold on the curve-inward front wheel, which defines an average pressure level, is increase according to the relation $$\Delta RS = k_1 * \Delta fws_{HA} + k_2 \, 1/a_{fz}$$

and decreased on the curve-outward wheel, and '$\Delta RS$' implies the amount of the threshold variation, '$\Delta fws_{HA}$' refers to the difference of the slip values on the rear wheels, '$a_{fz}$' implies the vehicle acceleration, and '$k_1 k_2$' are constants.

8. The method as claimed in claim 7, wherein, during brake operations without anti-lock control, the constants $k_1 k_2$ adopt different predetermined values versus brake operations with anti-lock control.

* * * * *

UNITED STATES PATENT AND TRADEMARK OFFICE
CERTIFICATE OF CORRECTION

PATENT NO.   : 6,012,010
DATED        : 01/04/00
INVENTOR(S)  : Batistic, Ivica, Helmut Fennel, and Hans-Joachim Buttner It is certified that error appears in the above-identified patent and that said Letters Patent is hereby corrected as shown below:

In column 6, in claim 3, on line 53, please change "$fws_{alt}$'" to --'$fws_{alt}$'--.

In column 8, in claim 7, on line 18, please change "increase" to --increased--.

Signed and Sealed this

Eighth Day of May, 2001

Attest:

NICHOLAS P. GODICI

Attesting Officer

Acting Director of the United States Patent and Trademark Office